United States Patent
Volchok

(10) Patent No.: US 10,348,503 B2
(45) Date of Patent: Jul. 9, 2019

(54) CLIENT SIDE ACTIONS VALIDATION

(71) Applicant: SAP PORTALS ISRAEL LTD., Ra'anana (IL)

(72) Inventor: Alex Volchok, Haifa (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 205 days.

(21) Appl. No.: 15/375,750

(22) Filed: Dec. 12, 2016

(65) Prior Publication Data

US 2018/0167214 A1    Jun. 14, 2018

(51) Int. Cl.
*H04L 9/32*      (2006.01)
*H04L 29/06*    (2006.01)

(52) U.S. Cl.
CPC ............ *H04L 9/32* (2013.01); *H04L 63/0428* (2013.01); *H04L 63/06* (2013.01)

(58) Field of Classification Search
CPC ....... H04L 9/32; H04L 63/0428; H04L 63/06; H04L 67/42
See application file for complete search history.

(56) References Cited

U.S. PATENT DOCUMENTS

| | | | | |
|---|---|---|---|---|
| 8,959,347 B2* | 2/2015 | Gupta | ................. | H04L 63/0428 713/170 |
| 9,350,714 B2* | 5/2016 | Freeman | ............. | H04L 63/0428 |
| 9,374,369 B2* | 6/2016 | Mahaffey | .............. | H04L 63/083 |
| 9,729,520 B2* | 8/2017 | Barton | ................ | H04L 63/0428 |
| 9,922,331 B2* | 3/2018 | Bigby | ..................... | G06Q 30/02 |
| 9,984,238 B1* | 5/2018 | Roth | ...................... | G06F 21/602 |
| 2011/0154465 A1* | 6/2011 | Kuzin | ................. | H04L 63/0815 726/9 |
| 2012/0018506 A1* | 1/2012 | Hammad | ................ | G06F 21/34 235/375 |
| 2012/0116976 A1* | 5/2012 | Hammad | ................ | G06F 21/34 705/67 |
| 2012/0198234 A1* | 8/2012 | Chung | .................. | H04L 9/3247 713/171 |
| 2013/0054968 A1* | 2/2013 | Gupta | ................. | H04L 63/0428 713/168 |
| 2013/0145447 A1* | 6/2013 | Maron | .................... | G06F 21/31 726/6 |
| 2013/0198510 A1* | 8/2013 | Rahman | .................. | H04L 9/321 713/155 |
| 2014/0012750 A1* | 1/2014 | Kuhn | ..................... | G06Q 20/36 705/41 |

(Continued)

*Primary Examiner* — Joseph P Hirl
*Assistant Examiner* — Stephen T Gundry
(74) *Attorney, Agent, or Firm* — Buckley, Maschoff & Talwalkar LLC

(57) ABSTRACT

A method and system including a display; a memory storing processor-executable process steps; and a processor to execute the processor-executable process steps to cause the system to: receive a first request at a server; generate a first dataset and a second dataset at the server, wherein the second dataset is encrypted; transmit the first and second dataset to a client; receive at the server a second request and the encrypted dataset, wherein the second request includes a request to execute an action with at least one data element in the first data set; and in response to receipt of the second request and encrypted dataset, decrypt the encrypted dataset to validate the second request. Numerous other aspects are provided.

20 Claims, 6 Drawing Sheets

(56) References Cited

U.S. PATENT DOCUMENTS

| | | | |
|---|---|---|---|
| 2014/0012751 A1* | 1/2014 | Kuhn | G06Q 20/36 705/41 |
| 2014/0164774 A1* | 6/2014 | Nord | G06F 21/602 713/171 |
| 2014/0180883 A1* | 6/2014 | Regan | G06Q 40/123 705/31 |
| 2014/0189808 A1* | 7/2014 | Mahaffey | H04L 63/083 726/4 |
| 2015/0039901 A1* | 2/2015 | Freeman | G06F 21/602 713/189 |
| 2015/0143117 A1* | 5/2015 | Freeman | H04L 63/0428 713/168 |
| 2015/0149421 A1* | 5/2015 | Foebel | G06F 17/30371 707/690 |
| 2015/0319144 A1* | 11/2015 | Barton | H04L 63/0428 713/168 |
| 2015/0350168 A1* | 12/2015 | Hayton | G06F 21/31 713/168 |
| 2015/0381621 A1* | 12/2015 | Innes | G06F 21/31 726/7 |
| 2016/0094539 A1* | 3/2016 | Suresh | H04L 67/025 726/7 |
| 2016/0104180 A1* | 4/2016 | Desautels | G06Q 30/0203 705/7.32 |
| 2016/0117511 A1* | 4/2016 | Freitas Fortuna dos Santos | H04L 63/0435 713/189 |
| 2017/0026342 A1* | 1/2017 | Sidana | H04L 9/008 |
| 2017/0046529 A1* | 2/2017 | Avi-Dan | G06F 21/6218 |
| 2017/0048211 A1* | 2/2017 | Avi-Dan | H04L 63/0807 |
| 2017/0048254 A1* | 2/2017 | Avi-Dan | G06F 21/62 |
| 2017/0116428 A1* | 4/2017 | Wu | G06F 21/6209 |
| 2017/0118268 A1* | 4/2017 | Wu | H04L 67/02 |
| 2017/0201520 A1* | 7/2017 | Chandoor | H04L 63/0853 |
| 2017/0277773 A1* | 9/2017 | Iasi | G06F 17/2205 |
| 2018/0039786 A1* | 2/2018 | Naqvi | G06Q 20/027 |
| 2018/0150647 A1* | 5/2018 | Naqvi | G06F 21/6218 |

\* cited by examiner

CLIENT SIDE ACTIONS VALIDATION

BACKGROUND

Enterprises typically use software applications and application-related services in the execution of their businesses. In a client-server environment, a user operating a client may issue a request to execute a given action on one or more data elements provided by a server. Typically, the server cannot simply assume that the client is authorized to execute the requested action, and may validate the request. To determine the validity of the request, the server accesses a database and applies one or more rules to the data stored therein. This validation process is costly, at least in terms of time and resources.

Systems and methods are desired which support efficient action validation.

DETAILED DESCRIPTION

Figure 1:
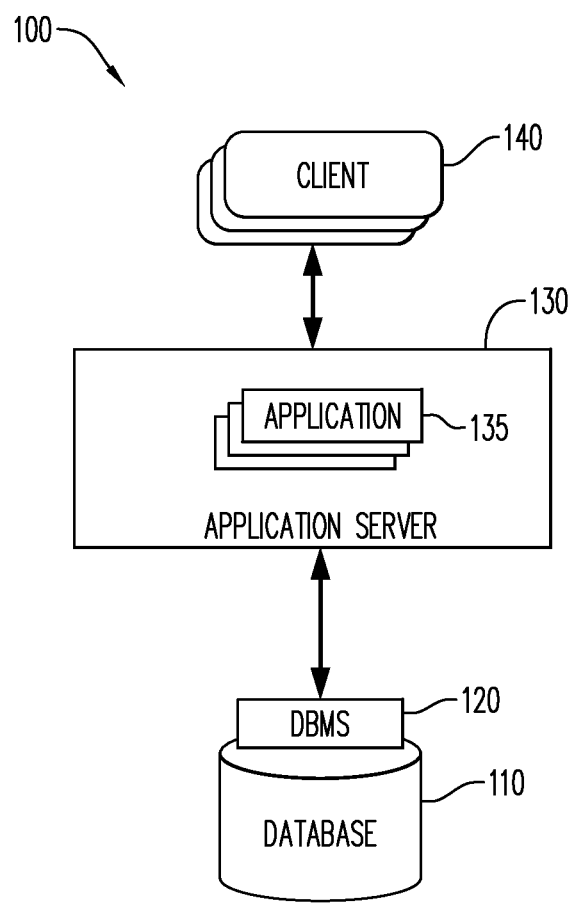
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Conventionally, a server performs two validations to execute an action for a client. For example, if a user is interested in buying a product, the user first accesses a website, for example, via a browser. The website may be provided by a server, which may access a database to provide the products, the actions associated with the product (e.g., purchase), and a price associated with the product to the website. Then the user inputs a purchase request to the website. The purchase request is then sent to the server for validation before the purchase request may be executed. The validation may include, for example, accessing the database again to verify that the product exists, and that the price of the product is correct. However, the server has already executed this validation before initially sending the product information to the website. The inventors note that effectively performing the validation twice may be a very expensive process, and in some instances is made more expensive by requiring the collection of information from multiple solution entities. For example, a query on a user table, a products table, and an available stock table may be run to understand if the product may be sold or is available.

Embodiments may provide for a client-side action validation process that may securely store data on the client (e.g., a browser). The validation process may include logic to validate the actions according to a set of predefined rules.

Some embodiments provide for the process to begin with a client (e.g., user via a browser) request for a user interface (e.g., web page). A server then accesses at least one database to retrieve the requested information (e.g., actionable information to provide on the webpage), and sends the information back to the client in two datasets—an unencrypted dataset and an encrypted dataset. Both datasets include items, and actions that may be performed on the given items in the dataset. The user makes a selection from the unencrypted list and the browser sends the selection and the encrypted dataset back to the server. The server checks the selection against the information in the encrypted dataset, and verifies the selection may be performed. Based on the verification, the server can validate (e.g., approve or decline) the selection. In one or more embodiments, since the encrypted dataset is returned to the server with the selection, the server does not have to access the databases for a second time to determine the validity of the request. The inventor notes a benefit of one or more embodiments is that a request may be faster and easier to process, and may require less resources.

Benefits of one or more embodiments include using the client as a party in the action validation flow, which may save the server large amounts of database load and avoid repeating verifications that the server has already performed. In one or more embodiments, new action validations may be easily added. For example, in one or more embodiments, the encrypted dataset may include all of the possible interactions between actions and entities returned to a given user. The server may then just validate that an action is allowed on the entity in the encrypted dataset. In a non-exhaustive example, if a list of all emails API is implemented, and all of a user's emails are returned to him, the user may access his mailbox and see a list of all the emails. At a later time, the user may be allowed to delete emails (new action). When the user indicates that an email should be deleted, the client may call the delete email/object ID rest end point. The server end point for this action may then check if the delete action may be performed on the object ID in the encrypted dataset.

One or more embodiments provide a scalable client-side validation process. In one non-exhaustive example, one server issues the unencrypted and encrypted dataset to the client, and then the process is scaled to thirty more servers. The unencrypted and encrypted datasets may be saved at the client, so that the thirty new servers may validate any selections from the client by knowing the encryption key, instead of applying complex logic and restarting the validation process from the beginning at the other servers.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135 and clients 140. Applications 135 may comprise server-side executable program code (e.g., compiled code, scripts, etc.) executing within application server 130 to receive queries from clients 140 and provides results to clients 140 based on data of database 110. One such application 135 may comprise an e-commerce website application.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the e-commerce website example, database 110 may include action information (e.g., open, delete, buy, sendMessage), and items/products for action (e.g., Item A, Item B, Item C, Item D, etc.), and quantity information (e.g., 0, 1, 2, 3, etc.) and/or any other data for providing in an e-commerce application.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each client 140 may comprise one or more individuals or devices executing program code of a software application for presenting user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 4:
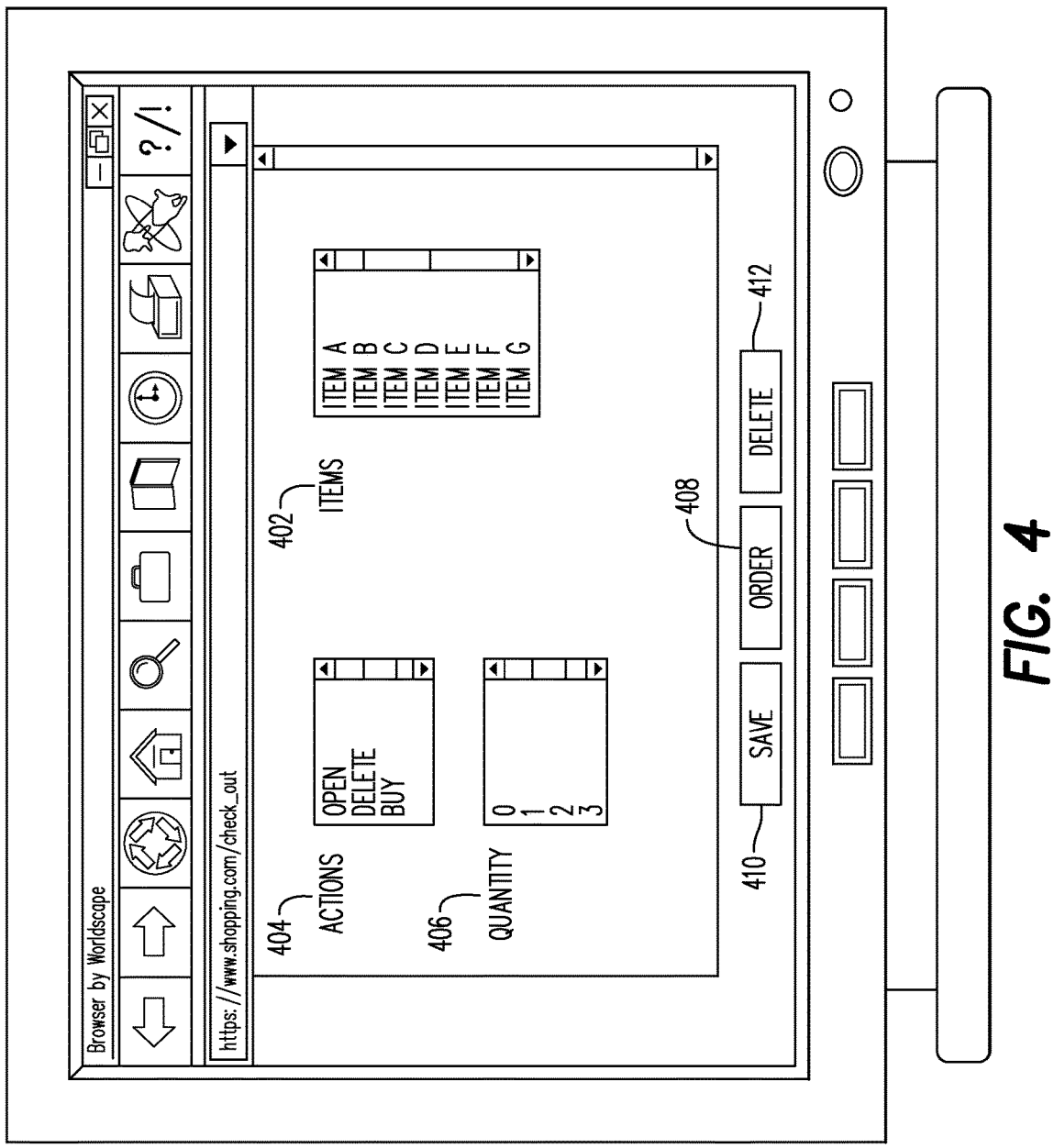
FIG. 4 is an outward view of a graphical interface according to some embodiments.

FIGS. 2-6 include an architecture (FIG. 2) and flow diagram of a process 300 (FIG. 3) according to some embodiments. Process 300 may be executed by application server 130 according to some embodiments, to provide a user with access to the user interface 400 (FIG. 4). In one or more embodiments, the application server 130 may be conditioned to perform the process 300, such that a processor 510 (FIG. 5) of the server 130 is a special purpose element configured to perform operations not performable by a general purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 400 may be presented on any type of display apparatus (e.g., desktop monitor, smartphone display, tablet display) provided by any type of client device (e.g., desktop system, smartphone, tablet computer). The application which is executed to provide user interface 400 may comprise a Web Browser, a standalone application, or any other application. Embodiments are not limited to user interface 400 of FIG. 4.

As used herein, the term "smartphone" refers to any cellular phone that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets may typically come loaded with a web browser and a variety of applications ("apps"). As used here, the term "app" refers to a self-contained program or piece of software designed to fulfill a particular purpose.

Figure 2:
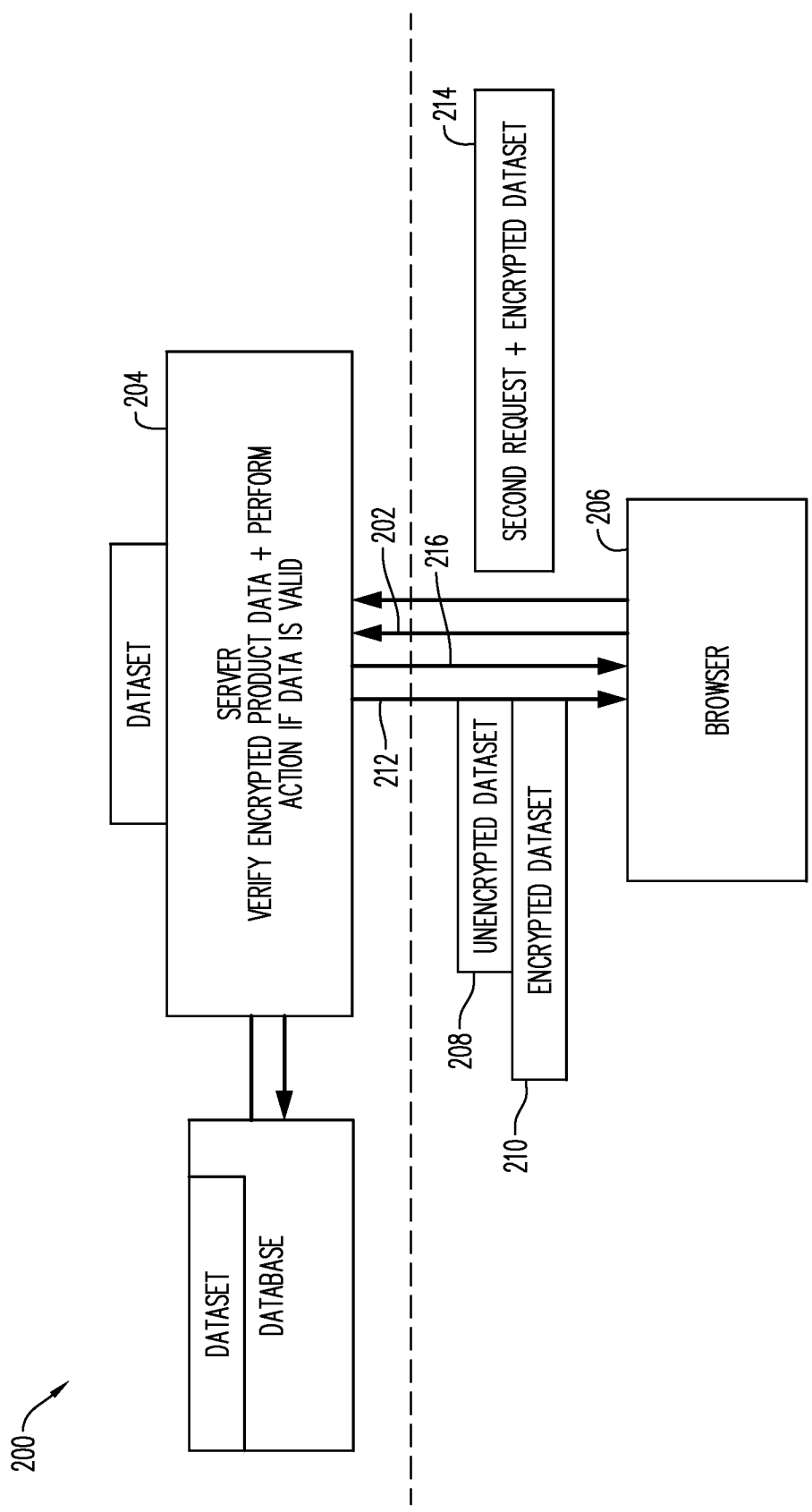
FIG. 2 is block diagram of a system architecture according to some embodiments.
Figure 3:
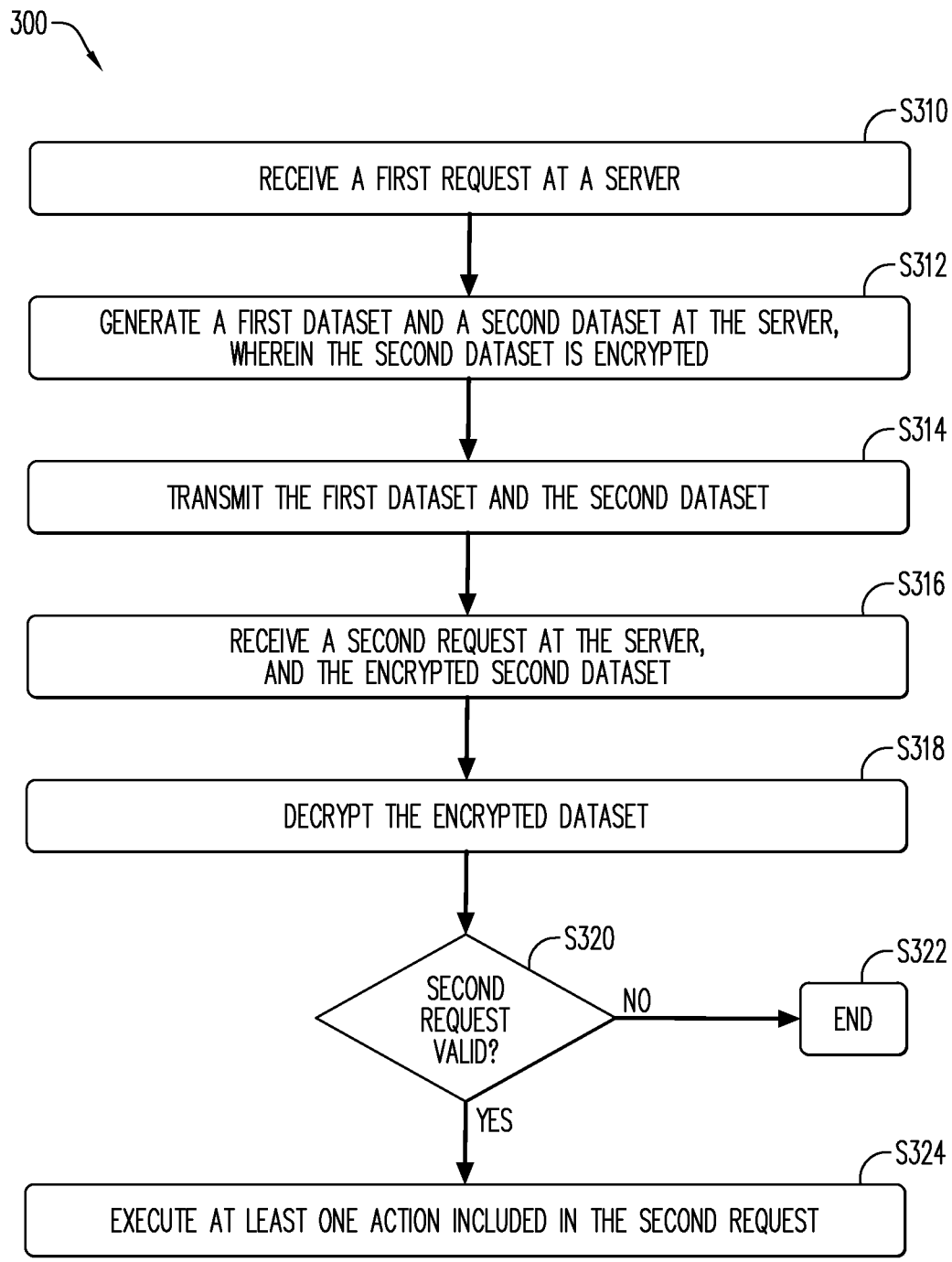
FIG. 3 is a flow diagram of a process according to some embodiments.
Figure 6:
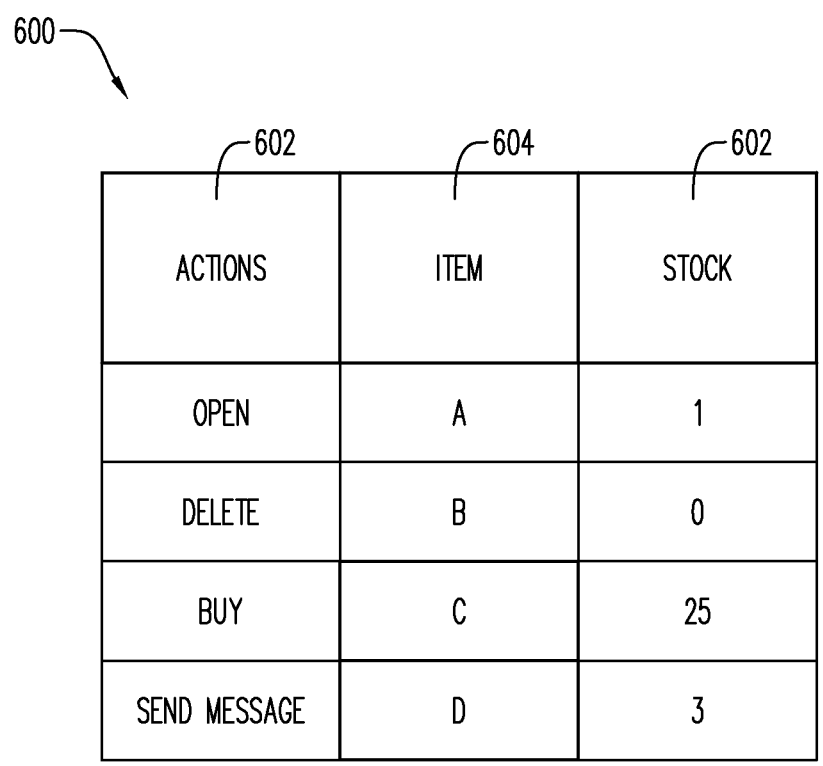
FIG. 6 is a table according to some embodiments.

Process 300 will be described with respect to FIGS. 2, 4 and 6 per a fictional e-commerce website. However, this is a non-exhaustive example, and the client-side validation process may be applied to any action that may be executed on a user interface screen. For example, sending a message to a friend on a social media website, deleting a post from a social media website, etc.

Initially at S310, a first request 202 is received at a server 204. When a user wants to access a website, they enter an address in a browser 206, and the request is transmitted to the server 204. This request for the website may be the first request 202 received at the server 204 in S310. In one or more embodiments, the browser 206 may ask the server 204 to display a webpage that includes a list of items 402 (FIG. 4). The items 402 may be, for example, apps, messages, users, or any other suitable item.

In response to the first request, the server 204 generates a first dataset 208 and a second dataset 210 in S312. Each dataset (208/210) may include items to be displayed on a user interface 400 (FIG. 4). The second dataset 210 may be encrypted. As used herein, the terms "second dataset" and "encrypted second dataset" may be used interchangeably. In one or more embodiments, encryption of the second dataset 210 may be via a secure token (e.g., a JSON web token (JWT)), or any other suitable encryption mechanism). In one or more embodiments, a JWT may be used to securely store a dataset at the client and later read this dataset on the server. The first dataset 208 may be in plain text (e.g., unencrypted). In one or more embodiments, each dataset (208/210) may include one or more items 402 and one or more actions 404 that may be executed for each item 402. In one or more embodiments, the actions 404 may include, for example, buy a product, sell a product, delete a product from the list, add a product to the list, send a message to a different user, verify stock, or any other suitable action. In some embodiments, the first dataset 208 and the second dataset 210 may include the same information, or similar information. For example, if the first dataset 208 includes a descriptive product list, the second dataset 210 may include an identification number for each product, instead of the whole description.

In one or more embodiments, the server 204 may access a database table 600 (FIG. 6) stored in a storage device 500 (FIG. 5) to generate the first dataset 208 and the second dataset 210. Note that the database table described herein is only one example, and additional and/or different information may be stored therein. Moreover, various database tables might be split or combined in accordance with any of the embodiments described herein.

In one or more embodiments, the table 600 may represent data that may be stored at the client-side validation apparatus 500 (FIG. 5) according to some embodiments. The table may define fields 602, 604 and 606 for each of the entries. The fields 602, 604, and 606 may, according to some embodiments, specify actions 602, items 604 and quantities 606 associated with the e-commerce website example described herein. In one or more embodiments, the actions 602 may identify modifications which may be applied to the associated items 604. In one or more embodiments, the quantity 606 may specify the number of items 604.

In keeping with the e-commerce website example, the items 402 may include one more items for sale (e.g., Item A, Item B, Item C, Item D, etc.), listed in the item 604 column of the table 600. The one or more actions 404 that may be executed may be listed in the action column 602 of the table 600 and may include an open action, a delete action, and a buy/purchase action. Other suitable actions may be used. In one or more embodiments, the open action may allow a user to obtain more information about the associated item. In some embodiments, each dataset (208/210) may include a quantity 406 associated with each item 402, and the quantity 406 may be included in the quantity column 606 of the table 600. A webpage including these items 402 and actions 404 may be displayed to a user via the user interface 400.

After the first dataset 208 and the second dataset 210 are generated, the first dataset 208 and the second dataset 210 are transmitted 212 to the browser 206 from the server 204 in S314. In some embodiments, the second dataset 210 may be encrypted on a cookie transmitted with the first dataset 208, or embedded with the action request transmission. The second dataset 210 may be transmitted to the browser 206 in any other suitable way. In one or more embodiments, the second dataset 210 is stored at the browser 206, and not otherwise manipulated, as the second dataset 210 is encrypted, and may be decrypted via the encryption key at the server 204.

Then in S316, the server 204 may receive a second request 214 from the browser 206 and the second dataset 210. The second request 214 may include the action 404 to be executed on a given item 402. Again, in one or more embodiments, the second dataset 210 may include the item(s) 402 and action(s) 404 and may be encrypted. In one or more embodiments, the browser 206 may automatically send the encrypted second dataset 210 to the server 204 with the second request 214. In one or more embodiments, the encrypted second dataset 210 may be encoded in a cookie sent with the second request 214, or may be embedded in the second request 214. For example, a javascript plugin may be added to any existing website or application, and the javascript plugin may be able to send the encrypted second dataset 210 with every second request 214 to the server 204. In one or more embodiments, the encrypted second dataset 210 may be in the form of an encrypted list fragment. In one or more embodiments, the encrypted second dataset 210 may be in the form of a list that may include a map of objects and each object in this map may list its allowed actions (e.g., read, write, delete, update, sendMsg, etc.). Other suitable forms may be used.

Continuing with the e-commerce website example, for a user to buy 2 of Item A, the user may select the buy action 404 to associate with item A 402, and in a quantity 406 of 2. After the user is satisfied with the selection, the user may select the order control 408 to execute the order, and the second request 214 is transmitted to the server 204. In one or more embodiments, the user interface 400 may include a save control 410 to save the user selections regarding item(s) 402 and action(s) 404, and a delete control 412 to delete the user selections regarding item(s) 402.

The server 204 receives the second request 214 and applies an encryption key (not shown) to decrypt the encrypted second dataset 210 in S318. The inventor notes that decrypting the encrypted second dataset 210, may authenticate the second dataset 210 to determine the data is safe. After the encrypted second dataset 210 is decrypted in S318, the server 204 determines if the second request 214 is valid in S320. In one or more embodiments, to determine wither the second request 214 is valid, the server may compare the action 404 and item 402 in the second request 214 with the actions 404 and items 402 included in the second dataset 210, and if the actions and items in the second request 214 correspond to the actions and items in the second dataset 210, the second request may be valid. In one or more embodiments, if at least one of the actions and items in the second request 214 are not included in the second dataset 210, the server may determine the second request 214 is invalid and then decline the second request 214. In one or more embodiments, the dataset may be represented as [object-allowedActions], and if the object does not include the action requested in the second request, the request may not be authorized, and conversely, if the object is not included in an object list, the request may not be authorized.

In one or more embodiments, the server 204 may also consider other factors in determining whether to approve the second request 214. For example, the server 204 may approve the second request 214 if the action 404 is requested in an allowed time frame and/or the action was not yet performed. In one or more embodiments, the determination if the action is valid with respect to a comparison of the second request 214 with the second dataset 210, and the action not yet performed may be in-memory validations in the server 204 running in a scope of a defined amount of time (e.g., 1-24 hours). The inventor notes that the defined amount of time may support rapid determination by the server 204. For example, in one or more embodiments, for each action that the server returns, a time-out may be specified, such that the encrypted dataset may include object+action+timeout. Then, if the time-out expires prior to execution of the action, the action may not be authorized. In one or more embodiments, timeframe validations may not require storage in the server 204.

If it is determined in S320 that the second request 214 is not valid, the server 204 may decline the second request 214 and the process 300 ends in S322. In one or more embodiments the server 204 may send a message 216 to the browser 206 declining the second request 214 and indicating the request is invalid.

If it is determined in S320 that the second request 214 is valid, the server 204 may approve the second request 214 and execute at least one action included in the second request in S324. In one or more embodiments, the server 204 may send a message 216 to the browser 206 approving the second request 214 and indicating the request is valid.

Continuing with the e-commerce website example, the browser 206 transmits the second request 214 to buy 2 of Item A, and the second dataset 210 to the server 204. The server 204 decrypts the second dataset 210 (S318) and determines that the second request 214 is valid (S320). In embodiments, the server 204 may then transmit the second request 214 to another device for execution of the request.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 5:
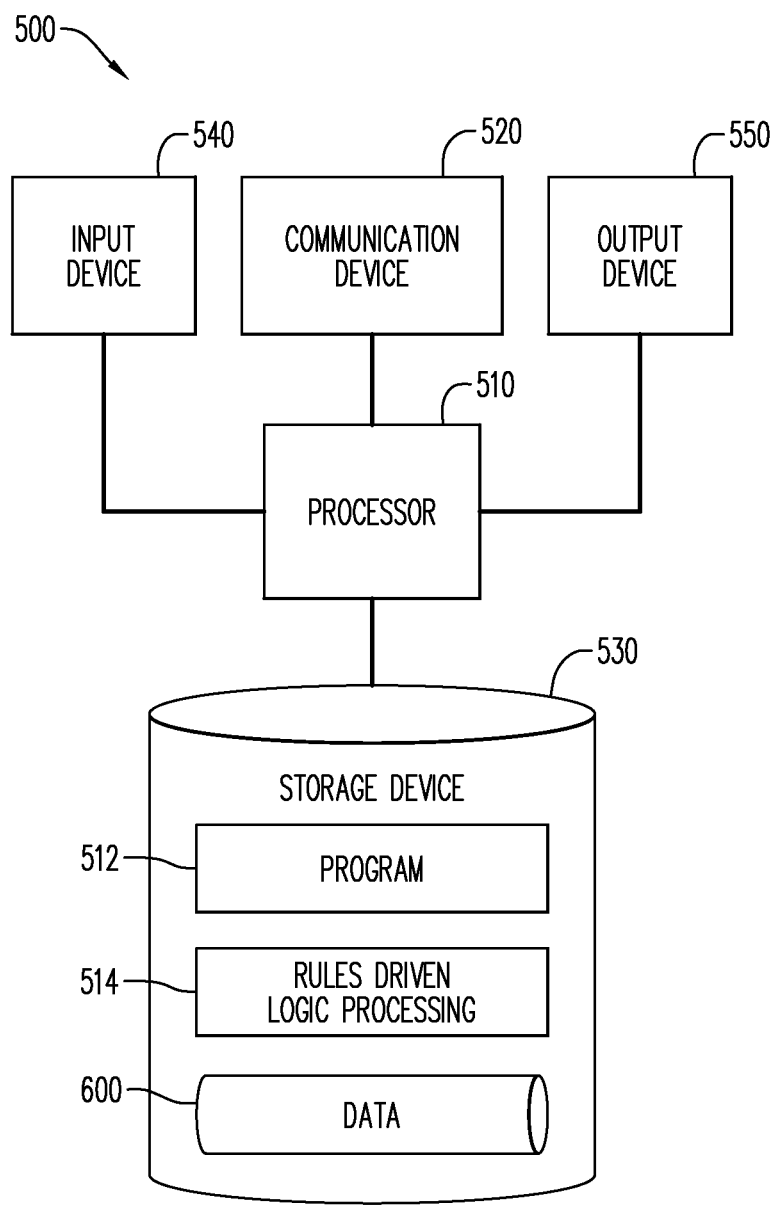
FIG. 5 is a block diagram of a system according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 100. Apparatus 500 may include other unshown elements according to some embodiments.

Apparatus 500 includes client-side validation processor 510 operatively coupled to communication device 520, data storage device 530, one or more input devices 540, one or more output devices 550 and memory 560. Communication device 520 may facilitate communication with external devices, such as application server 130. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The storage device 530 stores a program 512 and/or client side validation platform logic 514 for controlling the processor 510. The processor 510 performs instructions of the programs 512, 514, and thereby operates in accordance with any of the embodiments described herein, including but not limited to process 300.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a display;
a memory storing processor-executable process steps; and
a processor to execute the processor-executable process steps to cause the system to:
receive a first request at a server;
generate a first dataset and a second dataset at the server based on data in at least one database, wherein the second dataset is encrypted, and wherein the second dataset includes one or more items and one or more actions that may be performed on the one or more items in the second dataset;
transmit the first and second dataset to a client;
receive at the server a second request and the encrypted dataset, wherein the second request includes a request to execute an action with at least one data element in the first dataset; and
in response to receipt of the second request and encrypted dataset, decrypt the encrypted dataset to validate the second request, wherein the server determines a validity of the second request without accessing the at least one database.

2. The system of claim 1, wherein in response to decrypting the encrypted dataset, the server is further operative to one of: approve or decline the second request.

3. The system of claim 2, wherein the processor-executable process steps further cause the system to:
in response to decrypting the encrypted dataset, determine the action included in the second request is approved if at least one of: the action is requested in an allowed time frame and the action was not yet executed.

4. The system of claim 1, wherein the second dataset includes one or more actions executable by the server.

5. The system of claim 4, wherein the processor-executable process steps further cause the system to:
in response to decrypting the encrypted dataset, determine the action included in the second request is declined if the action is not one of the one or more actions included in the encrypted dataset.

6. The system of claim 4, wherein the processor-executable process steps further cause the system to:
execute the action if the action is one of the one or more actions executable by the server.

7. The system of claim 1, wherein each of the first request and the second request is received from the client.

8. The system of claim 1, wherein the second request automatically includes the encrypted dataset.

9. The system of claim 1, wherein the first dataset is in a plain text format.

10. The system of claim 1, further comprising a private key at the server to decrypt the encrypted dataset.

11. A computer-implemented method comprising:
receiving a first request at a server;
generating a first dataset and a second dataset at the server based on data in at least one database, wherein the second dataset is encrypted, and wherein the second dataset includes one or more items and one or more actions that may be performed on the one or more items in the second dataset;
transmitting the first and second dataset to a client;
receiving at the server a second request and the encrypted dataset, wherein the second request includes a request to execute an action with at least one data element in the first data set;
in response to receipt of the second request and the encrypted dataset, decrypting the encrypted dataset to validate the second request, wherein the server determines a validity of the second request without accessing the at least one database; and
approving or declining the second request in response to decrypting the encrypted dataset.

12. The method of claim 11, further comprising:
in response to decrypting the encrypted dataset, determining the action included in the second request is approved if at least one of: the action is requested in an allowed time frame and the action was not yet executed.

13. The method of claim 11, further comprising:
in response to decrypting the encrypted dataset, determining the action included in the second request is declined if the action is not included in the encrypted dataset.

14. The method of claim 11, wherein the second dataset includes one or more actions executable by the server.

15. The method of claim 14, further comprising:
executing the action if the action is one of the one or more actions executable by the server.

16. A non-transitory computer-readable medium storing program code, the program code executable by a computer system to cause the computer system to:
receive a first request at a server;
generate a first dataset and a second dataset at the server based on data in at least one database, wherein the second dataset is encrypted, and wherein the second dataset includes one or more items and one or more actions that may performed on the one or more items in the second dataset;
transmit the first and second dataset to a client;
receive at the server a second request and the encrypted dataset, wherein the second request includes a request to execute an action with at least one data element in the first data set;
in response to receipt of the second request, decrypt the encrypted dataset to validate the second request, wherein the server determines a validity of the second request without accessing the at least one database; and
determine if the second request is valid.

17. The medium of claim 16, wherein the second request is valid if the executable action and data element in the second request are also included in the encrypted dataset.

18. The medium of claim 16, wherein the second dataset includes one or more actions executable by the server.

19. The medium of claim 18, wherein the program code executable by a computer system further causes the computer system to:
   execute the action if the action is one of the one or more actions executable by the server.

20. The medium of claim 16, wherein the second request automatically includes the encrypted dataset.

\* \* \* \* \*